US012613534B2

(12) United States Patent
Hanauer et al.

(10) Patent No.: US 12,613,534 B2
(45) Date of Patent: Apr. 28, 2026

(54) METHODS AND SYSTEMS FOR JOBSITE CREATION

(71) Applicant: Caterpillar Inc., Peoria, IL (US)

(72) Inventors: Nicholas Hanauer, Washington, IL (US); Chad Brickner, Dunlap, IL (US); Manaswini Nama, Dunlap, IL (US); Bradley Bomer, Perkin, IL (US); Rajesh Ramamoorthy, Tamil Nadu (IN); Gowtham Krishnan, Tamil Nadu (IN); Mugesh Ganesh, Tamil Nadu (IN)

(73) Assignee: Caterpillar Inc., Peoria, IL (US)

( * ) Notice: Subject to any disclaimer, the term of this patent is extended or adjusted under 35 U.S.C. 154(b) by 223 days.

(21) Appl. No.: 18/525,514

(22) Filed: Nov. 30, 2023

(65) Prior Publication Data

US 2025/0181077 A1      Jun. 5, 2025

(51) Int. Cl.
G05D 1/648 (2024.01)
G05D 101/15 (2024.01)
G05D 107/70 (2024.01)

(52) U.S. Cl.
CPC ......... G05D 1/648 (2024.01); G05D 2101/15 (2024.01); G05D 2107/70 (2024.01)

(58) Field of Classification Search
CPC .............. G05D 1/648; G05D 2101/15; G05D 2107/70; E02F 9/2054; E02F 9/261; E02F 9/264; G06Q 10/06
See application file for complete search history.

(56) References Cited

U.S. PATENT DOCUMENTS

| | | | |
|---|---|---|---|
| 7,921,000 B2 | 4/2011 | Ohkura et al. | |
| 10,872,302 B2 | 12/2020 | Selvaraj et al. | |
| 2002/0059320 A1 | 5/2002 | Tamaru | |
| 2008/0084332 A1 | 4/2008 | Ritter et al. | |
| 2017/0314232 A1* | 11/2017 | Chi ...................... | G06F 3/0484 |
| 2020/0117201 A1 | 4/2020 | Oetken et al. | |
| 2021/0097462 A1 | 4/2021 | Brickner et al. | |
| 2021/0216889 A1* | 7/2021 | Spurgeon .............. | G06Q 10/08 |
| 2021/0318666 A1* | 10/2021 | Brockhurst ........... | G06N 5/025 |
| 2022/0187823 A1 | 6/2022 | Ramasamy et al. | |

FOREIGN PATENT DOCUMENTS

| | | |
|---|---|---|
| EP | 2587419 A2 | 1/2013 |
| KR | 102026268 B1 | 9/2019 |
| WO | 2021101241 A1 | 5/2021 |

* cited by examiner

*Primary Examiner* — Nga X Nguyen

(57) ABSTRACT

A technique is directed to methods and systems for creating digital representations jobsites. The jobsite creation system can collect machine data, such as location data, from machines in a worksite and determine the role, such as loading, hauling, drilling, etc. of each machine in the worksite. The machines are grouped together and organized based on which machines operate in a geographic region together. The jobsite creation system generates a digital representation of a jobsite with a site boundary based on the machine groupings. A user can view the jobsite on a user interface to monitor the operation of the machines and track productivity and utilization data for the machines in the jobsite.

18 Claims, 6 Drawing Sheets

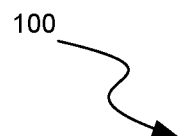
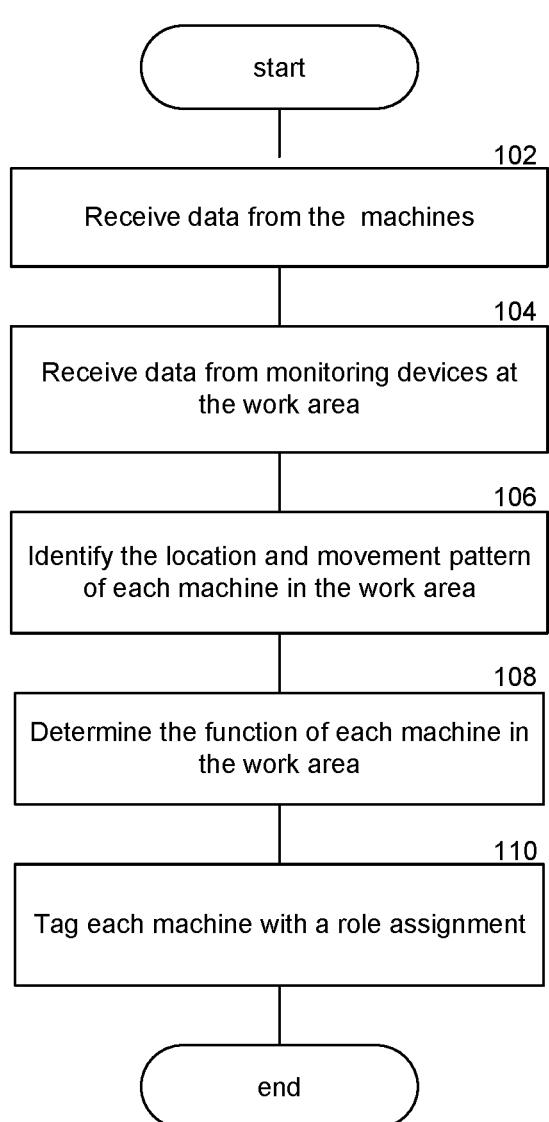
100
start
102
Receive data from the machines
104
Receive data from monitoring devices at the work area
106
Identify the location and movement pattern of each machine in the work area
108
Determine the function of each machine in the work area
110
Tag each machine with a role assignment
end
*FIG. 1*

200

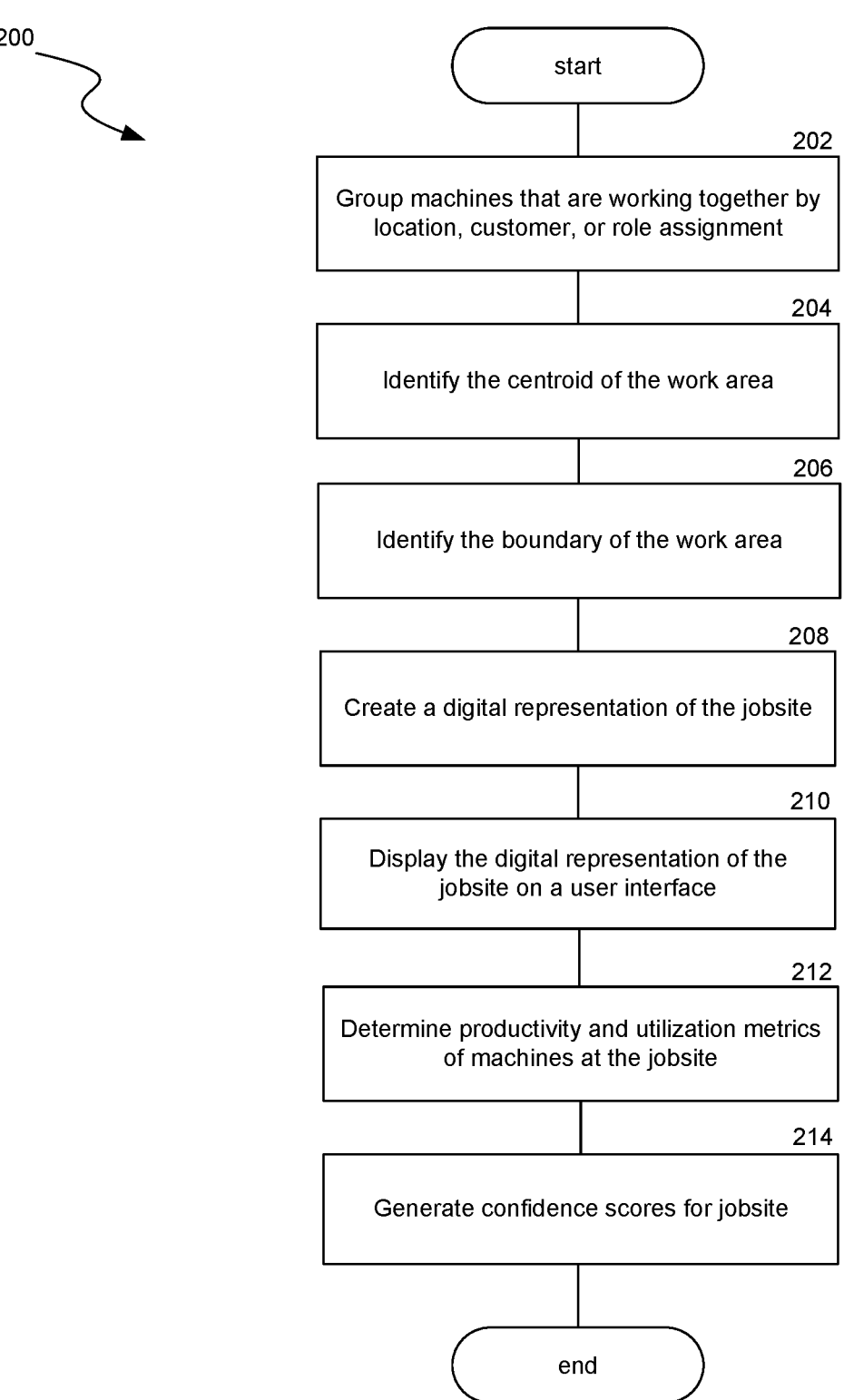

start

202

Group machines that are working together by location, customer, or role assignment

204

Identify the centroid of the work area

206

Identify the boundary of the work area

208

Create a digital representation of the jobsite

210

Display the digital representation of the jobsite on a user interface

212

Determine productivity and utilization metrics of machines at the jobsite

214

Generate confidence scores for jobsite end

*FIG. 2*

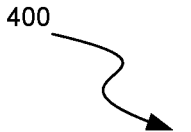
400
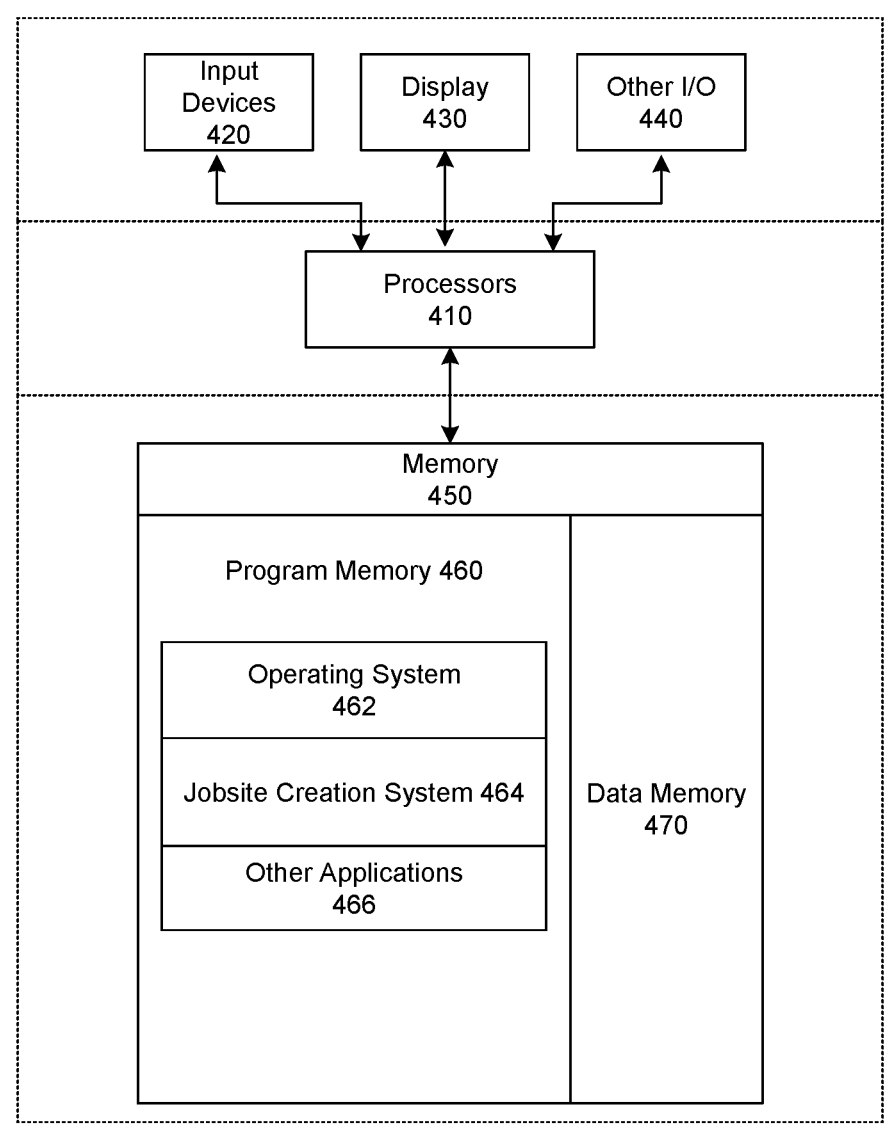
| Input Devices 420 | Display 430 | Other I/O 440 |
Processors 410
Memory 450
Program Memory 460
Operating System 462
Jobsite Creation System 464
Other Applications 466
Data Memory 470
*FIG. 4*

600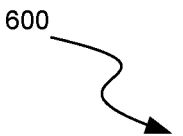
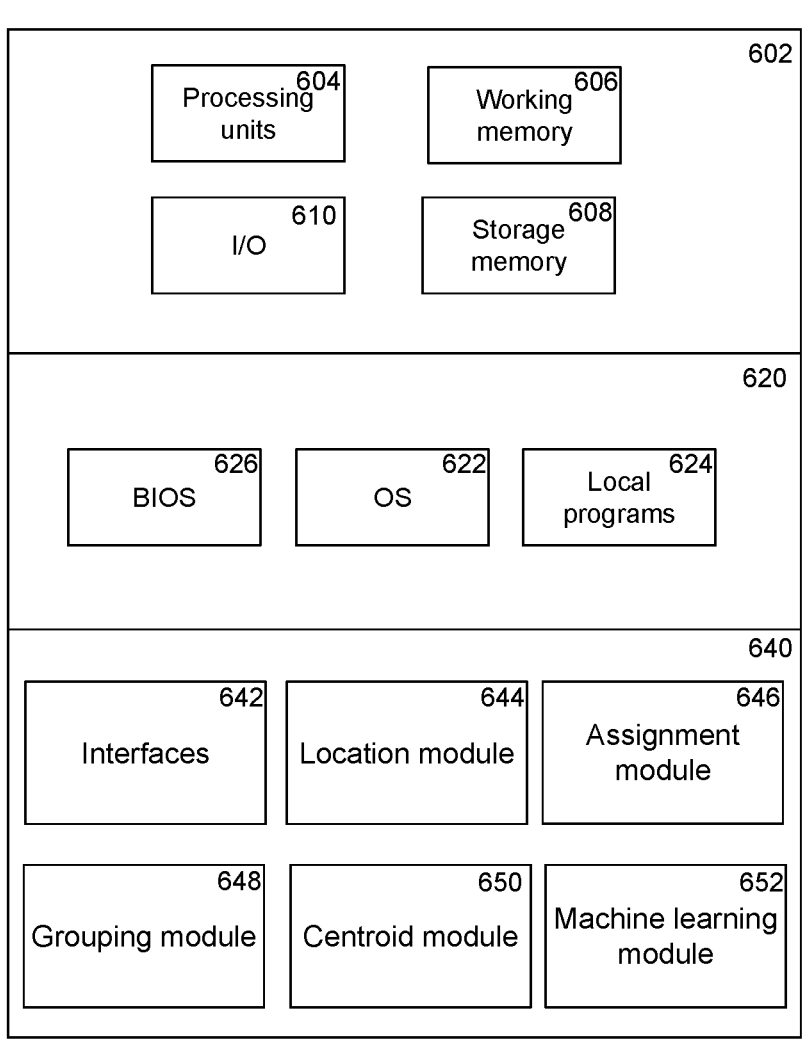
*FIG. 6*

METHODS AND SYSTEMS FOR JOBSITE CREATION

BACKGROUND

Generally, construction machines, such as loader or hauler machines, are frequently moved between different jobsites based on requirements. However, the machine and production data for a jobsite is difficult to obtain as machines are frequently moved to different locations without documentation. Currently, to create a digital representation of a jobsite a user must manually input the machine and production data into a system. Companies have implemented various techniques to solve this problem. For example, Patent Publication No. EP2587419A2 describes a method for collecting machine information to determine the production and utilization of a machine. However, this method is only directed to calculating the utilization and production of a machine. Additionally, U.S. Patent Publication No. US20210097462A1 describes a method for collecting data as machines perform tasks of a worksite plan. However, this method is directed to determining and reporting production metrics of different types of machines.

SUMMARY

Other aspects will appear hereinafter. The features described herein can be used separately or together, or in various combinations of one or more of them. In some aspects, the techniques described herein relate to a computing system including: at least one processor; and at least one memory storing instructions that, when executed by the at least one processor, cause the computing system to perform a process for generating digital representations of jobsites, the process including: identifying locations of a plurality of machines operating in a jobsite; organizing at least two machines of the plurality of machines into at least one group of machines; determining a centroid of the jobsite based on the locations of the plurality of machines and the at least one group of machines; determining a boundary of the jobsite based on the locations of the plurality of machines relative to the centroid; and generating a digital representation of the jobsite that illustrates the locations of the plurality of machines within the boundary and the at least one group of machines.

In some aspects, the techniques described herein relate to a computing system, wherein the process further includes: receiving machine data from devices mounted on the plurality of machines; and determining the locations of the plurality of machines based on the machine data. In some aspects, the techniques described herein relate to a computing system, wherein the process further includes: determining at least one movement pattern of at least one machine of the plurality of machines based on the locations; determining a role assignment of the at least one machine based on the at least one movement pattern; and tagging the at least one machine with the role assignment.

In some aspects, the techniques described herein relate to a computing system, wherein the process further includes: organizing the at least two machines into the at least one group of machines based on machine type, location, or role assignment of the at least two machines. In some aspects, the techniques described herein relate to a computing system, wherein the process further includes: displaying the digital representation of the jobsite in a user interface; and receiving, via the user interface, one or more edits to the digital representation of the jobsite.

In some aspects, the techniques described herein relate to a computing system, wherein the boundary of the jobsite is dynamic based on changing locations of the plurality of machines. In some aspects, the techniques described herein relate to a computing system, wherein the digital representation of the jobsite is generated by at least one machine-learning algorithm, wherein the at least one machine-learning algorithm is trained based on at least one dataset associated with previously generated digital representations of jobsites.

In some aspects, the techniques described herein relate to a method for generating digital representations of jobsites, the method including: identifying locations of a plurality of machines operating in a jobsite; organizing at least two machines of the plurality of machines into at least one group of machines; determining a centroid of the jobsite based on the locations of the plurality of machines and the at least one group of machines; determining a boundary of the jobsite based on the locations of the plurality of machines relative to the centroid; and generating a digital representation of the jobsite that illustrates the locations of the plurality of machines within the boundary and the at least one group of machines.

In some aspects, the techniques described herein relate to a method, further including: receiving machine data from devices mounted on the plurality of machines; and determining the locations of the plurality of machines based on the machine data. In some aspects, the techniques described herein relate to a method, further including: determining at least one movement pattern of at least one machine of the plurality of machines based on the locations; determining a role assignment of the at least one machine based on the at least one movement pattern; and tagging the at least one machine with the role assignment.

In some aspects, the techniques described herein relate to a method, further including: organizing the at least two machines into the at least one group of machines based on machine type, location, or role assignment of the at least two machines. In some aspects, the techniques described herein relate to a method, further including: displaying the digital representation of the jobsite in a user interface; and receiving, via the user interface, one or more edits to the digital representation of the jobsite.

In some aspects, the techniques described herein relate to a method, wherein the boundary of the jobsite is dynamic based on changing locations of the plurality of machines. In some aspects, the techniques described herein relate to a method, wherein the digital representation of the jobsite is generated by at least one machine-learning algorithm, wherein the at least one machine-learning algorithm is trained based on at least one dataset associated with previously generated digital representations of jobsites.

In some aspects, the techniques described herein relate to a non-transitory computer-readable storage medium including: a set of instructions that, when executed by at least one processor, causes the at least one processor to perform operations for generating digital representations of jobsites, the operations including: identifying locations of a plurality of machines operating in a jobsite; organizing at least two machines of the plurality of machines into at least one group of machines; determining a centroid of the jobsite based on the locations of the plurality of machines and the at least one group of machines; determining a boundary of the jobsite based on the locations of the plurality of machines relative to the centroid; and generating a digital representation of the jobsite that illustrates the locations of the plurality of machines within the boundary and the at least one group of machines.

In some aspects, the techniques described herein relate to a non-transitory computer-readable storage medium, wherein the operations further include: receiving machine data from devices mounted on the plurality of machines; and determining the locations of the plurality of machines based on the machine data. In some aspects, the techniques described herein relate to a non-transitory computer-readable storage medium, wherein the operations further include: determining at least one movement pattern of at least one machine of the plurality of machines based on the locations; determining a role assignment of the at least one machine based on the at least one movement pattern; and tagging the at least one machine with the role assignment. In some aspects, the techniques described herein relate to a non-transitory computer-readable storage medium, wherein the operations further include: organizing the at least two machines into the at least one group of machines based on machine type, location, or role assignment of the at least two machines.

In some aspects, the techniques described herein relate to a non-transitory computer-readable storage medium, wherein the operations further include: displaying the digital representation of the jobsite in a user interface; and receiving, via the user interface, one or more edits to the digital representation of the jobsite. In some aspects, the techniques described herein relate to a non-transitory computer-readable storage medium, wherein the digital representation of the jobsite is generated by at least one machine-learning algorithm, wherein the at least one machine-learning algorithm is trained based on at least one dataset associated with previously generated digital representations of jobsites.

BRIEF DESCRIPTION OF THE DRAWINGS

FIG. 1 is a flow diagram illustrating a process used in some implementations for collecting and analyzing machine data.

FIG. 2 is a flow diagram illustrating a process used in some implementations for creating a jobsite.

FIG. 4 is a block diagram illustrating an overview of devices on which some implementations can operate.

FIG. 6 is a block diagram illustrating components which in some implementations can be used in a system employing the disclosed technology.

The techniques introduced here may be better understood by referring to the following Detailed Description in conjunction with the accompanying drawings, in which like reference numerals indicate identical or functionally similar elements.

DETAILED DESCRIPTION

Figure 3:
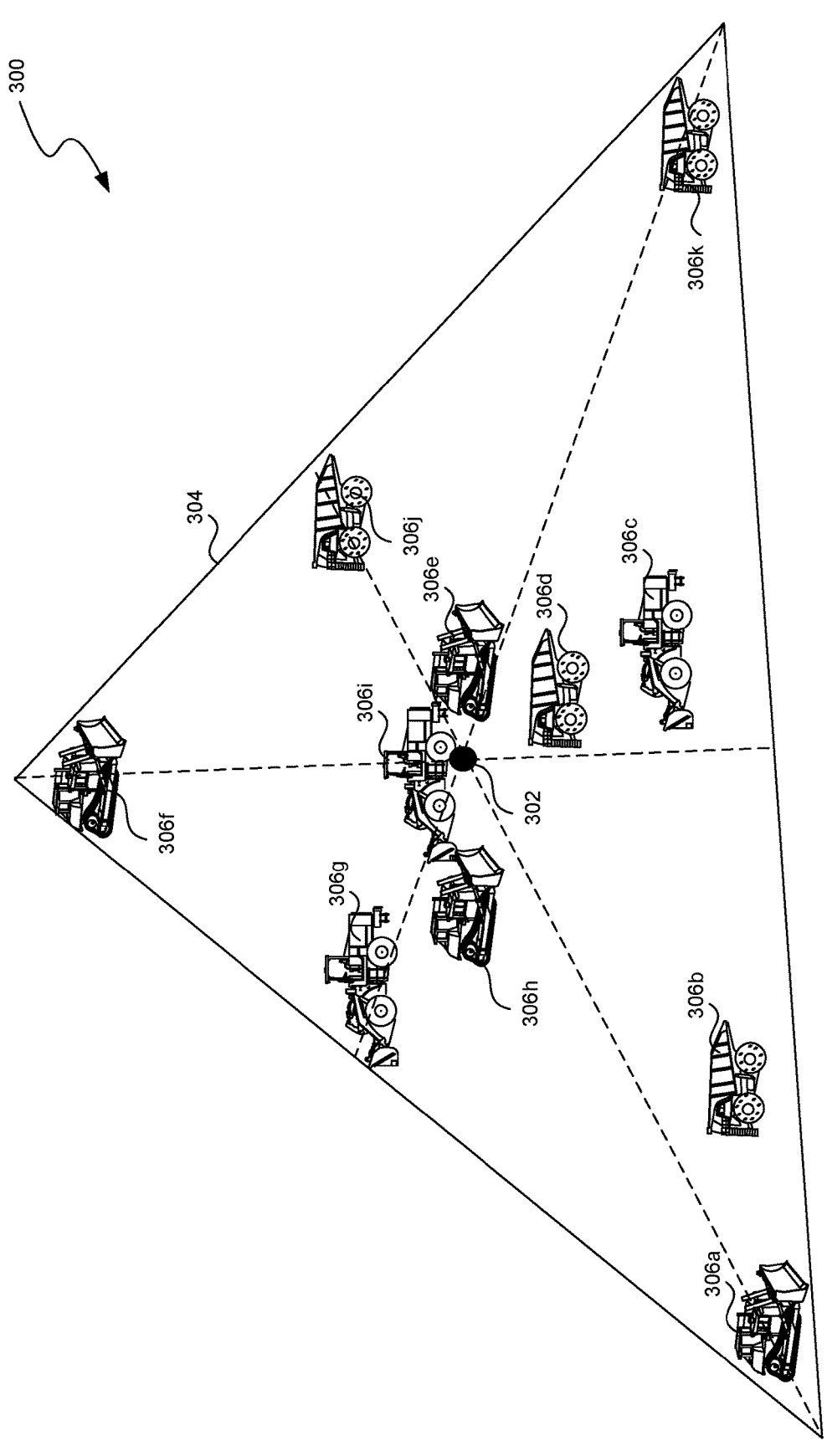
FIG. 3 is a diagram illustrating a boundary, machine locations, and centroid of a jobsite, according to the present disclosure.

Aspects of the present disclosure are directed to methods and systems for creating jobsites. Machines at a worksite operate in groups based on the task the machines perform. However, as machines frequently arrive and leave a worksite, users are unaware of the size of the worksite or the number of machines in the worksite, unless the users manually track the machines. A jobsite creation system can collect machine data, such as location data, from machines in a worksite and determine the role (e.g., loading, hauling, drilling, etc.) of each machine. The machines are grouped together and organized based on which machines operate in a geographic region together. The jobsite creation system generates a digital representation of a jobsite with a site boundary based on the machine groupings. A user can view the jobsite on a user interface to monitor the operation of the machines and track productivity and utilization data for the machines in the jobsite.

As described in detail below, implementations of the present technology can provide technical advantages over conventional technology by: 1) eliminating the requirement to manually define/build digital representations of jobsites; 2) allowing for jobsites to be created without a geofence; 3) not creating new sites within a set distance on an existing jobsite; 4) supporting effective and timely tracking of productivity and utilization data; and 5) increasing the efficiency of a jobsite by providing operation recommendations.

Several implementations are discussed below in more detail in reference to the figures. FIG. 1 is a flow diagram illustrating a process 100 used in some implementations for collecting and analyzing machine data. In some implementations, process 100 is triggered by a user activating a jobsite creation application, powering on a device, the user accessing a jobsite creation database via a website portal, a machine or device sending data to the jobsite creation system, or the user downloading an application on a device to access the jobsite creation system. In various implementations, some or all of process 100 is performed locally on the user device or performed by cloud-based device(s) that can provide/support the jobsite creation system.

At step 102, process 100 receives machine data from machines in a work area. The data can include, machine location, machine identifier number, speed of travel, machine type, machine function, machine owner, productivity information, utilization information, duration the machine has been within a proximity of a location, maintenance information, serial number, machine identifier, or subscription information. The machine can collect the information via one or more devices (e.g., 3D cameras, sensors, infrared cameras, range finders, geolocation monitors, motion sensors, laser scanners, accelerometers, temperature sensors, vibration sensors, or tilt sensors, etc.) attached to the machine. Examples of machines are, but not limited to, bulldozers, excavators, trenchers, loaders, backhoes, compactors, graders, feller bunches, graders, wheel tractor scrapers, skid-steer loaders, dump trucks, cranes, telehandlers, pavers, pile-driving/boring machines, or any mining or construction machines. A "work area" as used herein refers to a location where work takes place. Examples of a work area are, but not limited to, a construction site, a mining site, oil fields, or a pipeline site.

At step 104, process 100 receives machine data from devices that monitor the work area. Monitoring devices (e.g., 3D cameras, sensors, satellites, drones, infrared cameras, range finders, geolocation monitors, motion sensors, temperature sensors, vibration or tilt sensors, laser scanning, belt scale system, crushing system, drones, site survey devices, etc.) can capture data (similar data to step 102) of the work area from various locations within and without the work area. In some implementations, process 100 receives survey data (e.g., elevation information, geographic information, etc.) from the monitoring devices. Process 100 can integrate the received machine data from the machine with the machine data received from the monitoring devices at the work area. The integrated data is stored in a database of the jobsite creation system.

At step 106, process 100 identifies the location and movement pattern of each machine. The location information, received via the machine or monitoring devices, can indicate the movement patterns of each machine within the work area. For example, the location information of a hauler machine indicates the travel path of the hauler, where the hauler is loaded and unloaded, the distance between loading and unloading points, or the duration between receiving material and unloading the material. The location information indicates where the machine has operated in the work area and the duration the machine is at each location. During a period (e.g., an hour, day, etc.), the locations of the machines provide the movement patterns of each machine operating within the work area.

At step 108, process 100 determines the function (e.g., loading, hauling, crushing, dozing, excavating, leveling, digging, etc.) of each machine in the work area. The location and movement pattern of a machine can indicate the function. For example, a loader machine operates within a proximity of a location as it loads hauler machines. Different types of machine can have different movement patterns, such as a hauler machine has a different movement pattern than a loader machine or a digger machine. For example, a loader machine turns and rotates as it loads a hauler machine, while the hauler machine during operation travels farther distances in the work area than the loader machine. Process 100 can determine the function of each machine based on the location of the machine. The location can indicate if the machine is leveling, digging, drilling, hauling, loading, or any operation based on the task being completed at the location. For example, if the task being performed at a specific location is leveling, process 100 determines the function of the machine is leveling.

In some implementations, a machine is associated with a subscription and a machine identifier that indicates the machine function, machine type, and/or location of the machine. For example, a user can input, via an application on a user interface, a customer identifier and/or machine serial number to identify the location and function of a machine. The application can cross-reference with data stored in a subscription system database about the machine to identify the machine role, type of asset, type of work, load zone information, dump zone information, or any identifying information associated with a machine. A machine can include on-board technology that sends information to the subscription system database. The information can include a categorization of a machine activity (e.g., segment and cycle, where segment is a subset of cycle, to describe incremental activity). Process 100 can integrate machine and work area information received from the individual machines, work area monitoring systems, and material measurement systems (e.g., conveyors, belts, optical, crusher systems, scales, survey equipment, etc.).

At step 110, process 100 tags each machine in the work area with a role assignment based on the function, location, and/or machine type. Each machine type performs a role in the work area and the tag identifies the type of machine and the function (e.g., type of work) the machine performs. Examples of tags include "loader" (loading machines internal to the site), "load-out" (loading machines external to the site), "hauler" (machines hauling material internal or external to a site), or other machine types ("compaction" "green" "motor grader" "misc.", etc.).

FIG. 2 is a flow diagram illustrating a process 200 used in some implementations for creating a jobsite. In some implementations, process 200 is triggered by a user activating a jobsite creation application, powering on a device, the user accessing a jobsite creation database via a website portal, a machine or device sending data to the jobsite creation system, or the user downloading an application on a device to access the jobsite creation system. In various implementations, some or all of process 200 is performed locally on the user device or performed by cloud-based device(s) that can provide/support the jobsite creation system.

At step 202, process 200 organizes the machines into groups based on the function, location, asset tag, and/or role assignment of the machines in the work area. In a first example, a hauler and a loader machine are grouped together since the loader machine loads the hauler machine with material. In a second example, a hauler machine and a loader machine are grouped together based on being within a proximity (e.g., 3 feet, 20 feet, 10 yards, or any amount of distance) of each for a time threshold (e.g., 20 seconds, 2 minutes, or any amount of time). In third example, two motor graders are grouped together based on the function and location of the motor graders indicating the motor graders are working as a pair. In a fourth example, machines are grouped according to the customers that own/lease each machine.

In some implementations, the machines are grouped together based on the zone of the work area that the machines are located in. For example, machines in a loading zone are grouped together, machines in a digging zone are grouped together, and/or machines in a grading zone are grouped together. Process 200 can group machines together based on the time of day. For example, a machines operating during a night shift are grouped together, while machines operating during the day shift are grouped together. Process 200 can assign a confidence score to each group based on the location, function, time of day, zone, and/or role assignment of each machine. The confidence score can indicate the likelihood that the machines are "working together". The confidence score can increase based on the number of factors that are used to group the machines together. For example, machines that are grouped together based on location, function, and zone have a higher confidence score than machines that are grouped together based only on function. In some implementations, the subscription associated with a machine indicates which machines are grouped together.

At step 204, process 200 identifies the centroid of the work area based on the locations of the machines. The centroid can be the area that the largest number of machines are located during operation. The centroid may be adjusted when machines are added, removed, or change locations in the work area. The centroid indicates the approximate center of a jobsite based on several machines working together. A system can create a radius around the centroid to not create additional sites within the radius and to prevent creation of a site which is already present. Additionally, the centroid location identifies the work area location.

At step 206, process 200 determines the boundary of the work area based on the centroid. The distance from the centroid to the boundary may be dynamic based on the machine locations moving during operation in the work area. Process 200 can use the boundary for data exclusion (e.g., ignore data outside the boundary) and as a line from which to identify machines leaving and entering the work area. The boundary can be stationary, temporary, or dynamic over time. For example, during construction of a roadway or bridge, the boundary and work area can move miles away from the initial construction location. In some implementations, a user, via an application on a user interface, can input/edit the boundary coordinates for the work area.

At step 208, process 200 creates a digital representation of a jobsite based on the boundary and centroid of the work area. The jobsite can display the locations and role assignment of each machine. In some implementations, a jobsite is not created within a certain range (e.g., 100 yards, 2 miles, or any determined distance) of another jobsite. The jobsite provides a real-time representation of how machines are interacting together and where improvement opportunities are. In some implementations, the digital representation of the jobsite is filtered based on customers. For example, customer A can view machines belonging to customer A and is unable to view information about machines belonging to customer B.

At step 210, process 200 displays the jobsite on a user interface. A user can edit the jobsite via the user interface by adjusting work zones, machine groupings, boundaries, role assignments, names, or machine identifiers. A user can add additional machines to the jobsite by entering a machine identifier or any machine information. Process 200 can pre-populate into a list the machines and the machine groupings for user review. FIG. 3 illustrates jobsite 300 that includes a boundary 304, machine locations 306 (306*a*, 306*b*, 306*c*, 306*d*, 306*e*, 306*f*, 306*g*, 306*h*, 306*i*, 306*j*, and 306*k*), and a centroid 302.

At step 212, process 200 determines productivity and utilization of machines at the jobsite. Process 200 can measure the productivity of machines working together based on the type of jobsite (e.g., roadway construction, mining operation, etc.), and generate a measured and expected progress for different stages of development at the jobsite. For example, grading at a jobsite needs to occur before compacting and leveling can occur. Process 200 can analyze the received machine data to determine (e.g., via machine learning) productivity and utilization metrics for each machine. For example, process 200 compares the performance of machines with similar roles to rank each machine and identify areas of improvement. The productivity and utilization of a jobsite can be calculated based on the interaction of all the machines on the jobsite. In some implementations, the productivity and utilization are calculated for machines moving from site to site.

At step 214, process 200 generates a confidence score for the jobsite. The confidence score can indicate if there are sufficient machines at the jobsite to complete a task by a deadline. Process 200 can generate and send a recommendation regarding machine pairings or recommend the next step in a jobsite construction process. For example, as machines complete a task, process 200 can schedule the next task for the machine to complete. Process 200 can calculate the confidence score using the number of machines which are included in the jobsite, the date of the last known location of the machine, the distance from the jobsite centroid to the machine, and other jobsites which are created.

FIG. 4 is a block diagram illustrating an overview of devices on which some implementations of the disclosed technology can operate. The devices can comprise hardware components of a device 400 that manage entitlements within a real-time telemetry system. Device 400 can include one or more input devices 420 that provide input to the processor(s) 410 (e.g., CPU(s), GPU(s), HPU(s), etc.), notifying it of actions. The actions can be mediated by a hardware controller that interprets the signals received from the input device and communicates the information to the processors 410 using a communication protocol. Input devices 420 include, for example, a mouse, a keyboard, a touchscreen, an infrared sensor, a touchpad, a wearable input device, a camera- or image-based input device, a microphone, or other user input devices.

Processors 410 can be a single processing unit or multiple processing units in a device or distributed across multiple devices. Processors 410 can be coupled to other hardware devices, for example, with the use of a bus, such as a PCI bus or SCSI bus. The processors 410 can communicate with a hardware controller for devices, such as for a display 430. Display 430 can be used to display text and graphics. In some implementations, display 430 provides graphical and textual visual feedback to a user. In some implementations, display 430 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 440 can also be coupled to the processor, such as a network card, video card, audio card, USB, firewire or other external device, camera, printer, speakers, CD-ROM drive, DVD drive, disk drive, or Blu-Ray device.

In some implementations, the device 400 also includes a communication device capable of communicating wirelessly or wire-based with a network node. The communication device can communicate with another device or a server through a network using, for example, TCP/IP protocols. Device 400 can utilize the communication device to distribute operations across multiple network devices.

The processors 410 can have access to a memory 450 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 450 can include program memory 460 that stores programs and software, such as an operating system 462, jobsite creation system 464, and other application programs 466. Memory 450 can also include data memory 470, storing location data, user data, machine data, grouping data, sensor data, device data, boundary data, management data, customer information data, subscription data, configuration data, settings, user options or preferences, etc., which can be provided to the program memory 460 or any element of the device 400.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 5:
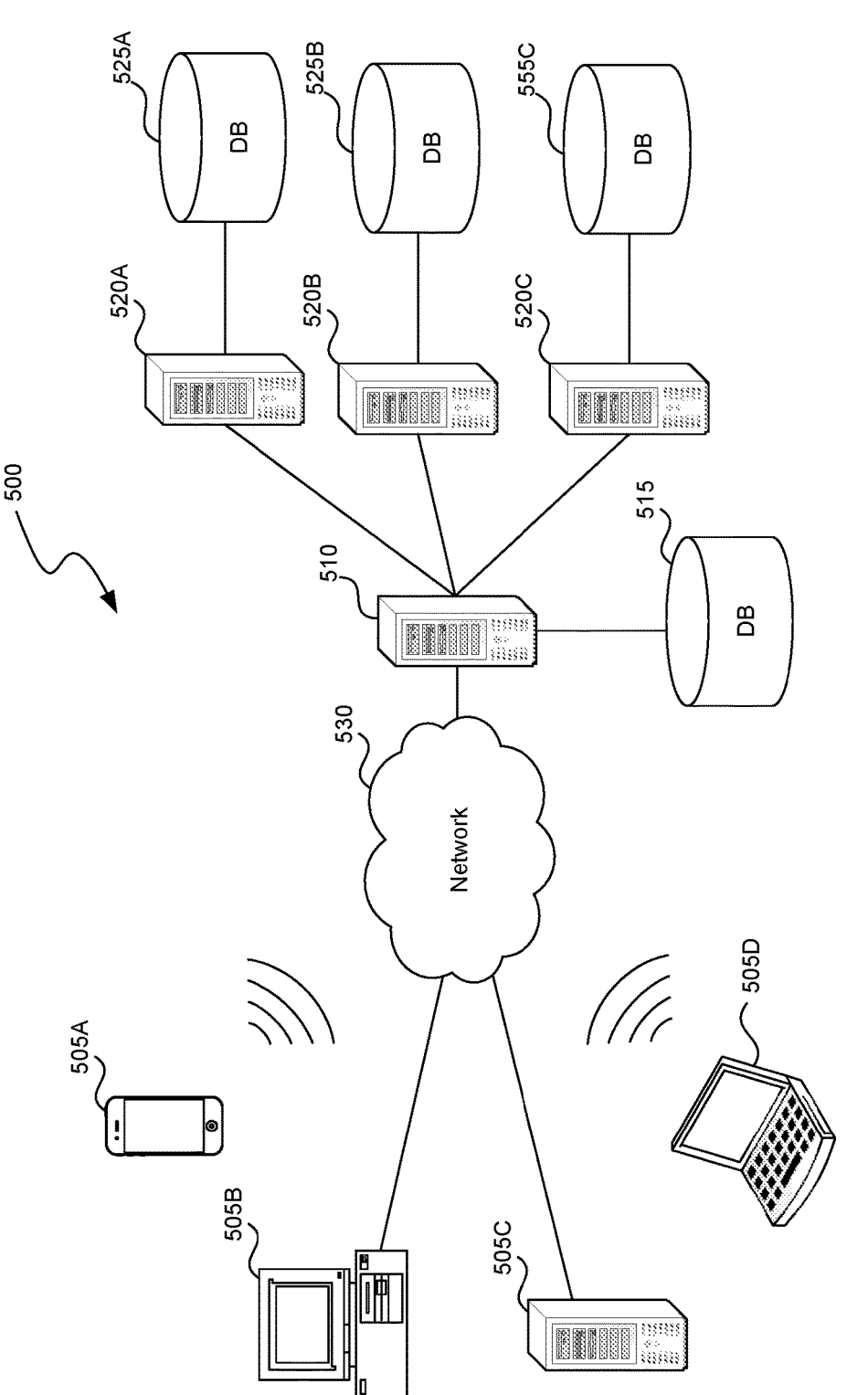
FIG. 5 is a block diagram illustrating an overview of an environment in which some implementations can operate.

FIG. 5 is a block diagram illustrating an overview of an environment 500 in which some implementations of the disclosed technology can operate. Environment 500 can include one or more client computing devices 505A-D, examples of which can include device 400. Client computing devices 505 can operate in a networked environment using logical connections through network 530 to one or more remote computers, such as a server computing device 510.

In some implementations, server 510 can be an edge server which receives client requests and coordinates fulfillment of those requests through other servers, such as servers 520A-C. Server computing devices 510 and 520 can comprise computing systems, such as device 400. Though each server computing device 510 and 520 is displayed logically as a single server, server computing devices can each be a distributed computing environment encompassing multiple computing devices located at the same or at geographically disparate physical locations. In some implementations, each server 520 corresponds to a group of servers.

Client computing devices 505 and server computing devices 510 and 520 can each act as a server or client to other server/client devices. Server 510 can connect to a database 515. Servers 520A-C can each connect to a corresponding database 525A-C. As discussed above, each server 520 can correspond to a group of servers, and each of these servers can share a database or can have their own database. Databases 515 and 525 can warehouse (e.g., store) information such as implement data, machine data, sensor data, device data, notification data, measurement, and alert data. Though databases 515 and 525 are displayed logically as single units, databases 515 and 525 can each be a distributed computing environment encompassing multiple computing devices, can be located within their corresponding server, or can be located at the same or at geographically disparate physical locations.

Network 530 can be a local area network (LAN) or a wide area network (WAN), but can also be other wired or wireless networks. Network 530 may be the Internet or some other public or private network. Client computing devices 505 can be connected to network 530 through a network interface, such as by wired or wireless communication. While the connections between server 510 and servers 520 are shown as separate connections, these connections can be any kind of local, wide area, wired, or wireless network, including network 530 or a separate public or private network.

FIG. 6 is a block diagram illustrating components 600 which, in some implementations, can be used in a system employing the disclosed technology. The components 600 include hardware 602, general software 620, and specialized components 640. As discussed above, a system implementing the disclosed technology can use various hardware including processing units 604 (e.g. CPUs, GPUs, APUs, etc.), working memory 606, storage memory 608 (local storage or as an interface to remote storage, such as storage 515 or 525), and input and output devices 610. In various implementations, storage memory 608 can be one or more of: local devices, interfaces to remote storage devices, or combinations thereof. For example, storage memory 608 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 515 or storage provided through another server 520). Components 600 can be implemented in a client computing device such as client computing devices 505 or on a server computing device, such as server computing device 510 or 520.

General software 620 can include various applications including an operating system 622, local programs 624, and a basic input output system (BIOS) 626. Specialized components 640 can be subcomponents of a general software application 620, such as local programs 624. Specialized components 640 can include location module 644, assignment module 646, grouping module 648, centroid module 650, machine learning module 652, and components which can be used for providing user interfaces, transferring data, and controlling the specialized components, such as interfaces 642. In some implementations, components 600 can be in a computing system that is distributed across multiple computing devices or can be an interface to a server-based application executing one or more of specialized components 640. Although depicted as separate components, specialized components 640 may be logical or other nonphysical differentiations of functions and/or may be submodules or code-blocks of one or more applications.

In some implementations, the location module 644 is configured to collect the location of the machine from the machine and/or monitoring devices at the work area. In some implementations, the location is collected via a subscription associated with the machine. The location module 644 identifies the location and movement pattern of each machine. The location information, received via the machine or monitoring devices, can indicate the movement patterns of each machine within the work area. For example, the location information of a hauler machine indicates the travel path of the hauler, where the hauler is loaded and unloaded, the distance between loading and unloading points, or the duration between receiving material and unloading the material. The location information indicates where the machine has operated in the work area and the duration the machine is at each location. During a period (e.g., an hour, day, etc.), the locations of the machines provide the movement patterns of each machine operating within the work area.

In some implementations, the assignment module 646 is configured to tag each machine in the work area with a role assignment based on the function, location, and/or machine type. Each machine type performs a role in the work area and the tag identifies the type of machine and the function (e.g., type of work) the machine performs. Examples of tags include "loader" (loading machines internal to the site), "load-out" (loading machines external to the site), "hauler" (machines hauling material internal or external to a site), or other machine types ("compaction" "green" "motor grader" "misc.", etc.).

In some implementations, the grouping module 648 is configured to organize the machines into groups based on the function, location, and/or role assignment of the machines in the work area. In a first example, a hauler and a loader machine are grouped together since the loader machine loads the hauler machine with material. In a second example, a hauler machine and a loader machine are grouped together based on being within a proximity (e.g., 3 feet, 20 feet, 10 yards, or any amount of distance) of each for a time threshold (e.g., 20 seconds, 2 minutes, or any amount of time). In third example, two motor graders are grouped together based on the function and location of the motor graders indicating the motor graders are working as a pair.

In some implementations, the grouping module 648 groups the machines together based on the zone of the work area that the machines are located in. For example, machines in a loading zone are grouped together, machines in a digging zone are grouped together, and/or machines in a grading zone are grouped together. The grouping module 648 can group machines together based on the time of day. For example, a machines operating during a night shift are grouped together, while machines operating during the day shift are grouped together. The grouping module 648 can assign a confidence score to each group based on the location, function, time of day, zone, and/or role assignment of each machine. The confidence score can indicate the likelihood that the machines are "working together". The confidence score can increase based on the number of factors that are used to group the machines together. For example, machines that are grouped together based on location, function, and zone have a higher confidence score than machines that are grouped together based only on function. In some implementations, the subscription associated with a machine indicates which machines are grouped together.

In some implementations, the centroid module 650 is configured to identify the centroid of the work area based on the locations of the machines. The centroid can be the area that the largest number of machines are located during operation. The centroid may be adjusted when machines are added, removed, or change locations in the work area.

The centroid module 650 determines the boundary of the work area based on the centroid. The distance from the centroid to the boundary may be dynamic based on the machine locations moving during operation in the work area. The centroid module 650 can use the boundary for data exclusion (e.g., ignore data outside the boundary) and as a line from which to identify machines leaving and entering the work area. The boundary can be stationary, temporary, or dynamic over time. For example, during construction of a roadway or bridge, the boundary and work area can move miles away from the initial construction location. In some implementations, a user, via an application on a user interface, can input/edit the boundary coordinates for the work area.

In some implementations, the machine learning module 652 is configured to generate a digital representation of a jobsite based on machine locations, machine groupings, role assignments, and/or the boundary and centroid of the work area. The machine learning module 652 may be configured to generate the digital representation of the jobsite based on at least one machine-learning algorithm trained on at least one dataset of digital representations of jobsites. The at least one machine-learning algorithms (and models) may be stored locally at databases and/or externally at databases. Customer data grouping devices may be equipped to access these machine learning algorithms and intelligently generate a digital representation of the jobsite based on at least one machine-learning model that is trained on a dataset of work area information. As described herein, a machine-learning (ML) model may refer to a predictive or statistical utility or program that may be used to determine a probability distribution over one or more-character sequences, classes, objects, result sets or events, and/or to predict a response value from one or more predictors. A model may be based on, or incorporate, one or more rule sets, machine learning, a neural network, or the like. In examples, the ML models may be located on the client device, service device, a network appliance (e.g., a firewall, a router, etc.), or some combination thereof. The ML models may process work area information databases and other data stores to determine how to generate the digital representation of a jobsite. Based on the work area information from jobsite creation databases and platforms and other user data stores, at least one ML model may be trained and subsequently deployed to automatically generate the digital representation of the jobsite. The trained ML model may be deployed to one or more devices. As a specific example, an instance of a trained ML model may be deployed to a server device and to a client device which communicate with a machine. The ML model deployed to a server device may be configured to be used by the client device when, for example, the client device is connected to the Internet. Conversely, the ML model deployed to a client device may be configured to be used by the client device when, for example, the client device is not connected to the Internet. In some instances, a client device may not be connected to the Internet but still configured to receive satellite signals with item information, such as specific customer information. In such examples, the ML model may be locally cached by the client device.

Those skilled in the art will appreciate that the components illustrated in FIGS. 4-6 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

INDUSTRIAL APPLICABILITY

The systems and methods described herein can create digital representations jobsites. Machines at a worksite operate in groups based on the task the machines perform. However, as machines frequently arrive and leave a worksite, users are unaware of the size of the worksite or the number of machines in the worksite, unless the users manually track the machines. The jobsite creation system can collect machine data, such as location data, from machines in a worksite and determine the role (e.g., loading, hauling, drilling, etc.) of each machine. The machines are grouped together and organized based on which machines operate in a geographic region together. The jobsite creation system generates a digital representation of a jobsite with a site boundary based on the machine groupings. A user can view the jobsite on a user interface to monitor the operation of the machines and track productivity and utilization data for the machines in the jobsite. The present systems and methods can be implemented to manage and control, multiple industrial machines, vehicles and/or other suitable devices such as mining machines, trucks, corporate fleets, etc.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

Unless explicitly excluded, the use of the singular to describe a component, structure, or operation does not exclude the use of plural such components, structures, or operations. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

As used herein, the expression "at least one of A, B, and C" is intended to cover all permutations of A, B and C. For example, that expression covers the presentation of at least one A, the presentation of at least one B, the presentation of at least one C, the presentation of at least one A and at least one B, the presentation of at least one A and at least one C, the presentation of at least one B and at least one C, and the presentation of at least one A and at least one B and at least one C.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A computing system comprising:
   at least one processor; and
   at least one memory storing instructions that, when executed by the at least one processor, cause the computing system to perform a process for generating digital representations of jobsites, the process comprising:
   receiving location data from one or more devices associated with a plurality of machines operating in a jobsite;
   identifying locations of the plurality of machines operating in the jobsite based upon the location data;
   organizing at least two machines of the plurality of machines into at least one group of machines;
   determining a centroid of the jobsite based on the locations of the plurality of machines and the at least one group of machines;
   determining a dynamic boundary of the jobsite based on the locations of the plurality of machines relative to the centroid, wherein the dynamic boundary of the jobsite changes as the locations of the plurality of machines move during operations;
   generating, using a machine learning module, a digital representation of the jobsite that illustrates the locations of the plurality of machines in real-time within the dynamic boundary and the at least one group of machines; and
   displaying, via a user interface, the digital representation of the jobsite.

2. The computing system of claim 1, wherein the process further comprises:
   receiving machine data from devices mounted on the plurality of machines; and
   determining the locations of the plurality of machines based on the machine data.

3. The computing system of claim 1, wherein the process further comprises:
   determining at least one movement pattern of at least one machine of the plurality of machines based on the locations;
   determining a role assignment of the at least one machine based on the at least one movement pattern; and
   tagging the at least one machine with the role assignment.

4. The computing system of claim 1, wherein the process further comprises:
   organizing the at least two machines into the at least one group of machines based on machine type, location, or role assignment of the at least two machines.

5. The computing system of claim 1, wherein the process further comprises:
   displaying the digital representation of the jobsite in a user interface; and
   receiving, via the user interface, one or more edits to the digital representation of the jobsite.

6. The computing system of claim 1, wherein the digital representation of the jobsite is generated by at least one machine-learning algorithm, wherein the at least one machine-learning algorithm is trained based on at least one dataset associated with previously generated digital representations of jobsites.

7. A method for generating digital representations of jobsites, the method comprising:
receiving location data from one or more devices associated with a plurality of machines operating in a jobsite;
identifying locations of the plurality of machines operating in the jobsite based upon the location data;
organizing at least two machines of the plurality of machines into at least one group of machines;
determining a centroid of the jobsite based on the locations of the plurality of machines and the at least one group of machines;
determining a dynamic boundary of the jobsite based on the locations of the plurality of machines relative to the centroid, wherein the dynamic boundary of the jobsite changes as the locations of the plurality of machines move during operations;
generating, using a machine learning module, a digital representation of the jobsite that illustrates the locations of the plurality of machines in real-time within the dynamic boundary and the at least one group of machines; and
displaying via a user interface, the digital representation of the jobsite.

8. The method of claim 7, further comprising:
receiving machine data from devices mounted on the plurality of machines; and
determining the locations of the plurality of machines based on the machine data.

9. The method of claim 7, further comprising:
determining at least one movement pattern of at least one machine of the plurality of machines based on the locations;
determining a role assignment of the at least one machine based on the at least one movement pattern; and
tagging the at least one machine with the role assignment.

10. The method of claim 7, further comprising:
organizing the at least two machines into the at least one group of machines based on machine type, location, or role assignment of the at least two machines.

11. The method of claim 7, further comprising:
displaying the digital representation of the jobsite in a user interface; and
receiving, via the user interface, one or more edits to the digital representation of the jobsite.

12. The method of claim 7, wherein the digital representation of the jobsite is generated by at least one machine-learning algorithm, wherein the at least one machine-learning algorithm is trained based on at least one dataset associated with previously generated digital representations of jobsites.

13. A non-transitory computer-readable storage medium comprising: a set of instructions that, when executed by at least one processor, causes the at least one processor to perform operations for generating digital representations of jobsites, the operations comprising:

receiving location data from one or more devices associated with a plurality of machines operating in a jobsite;
identifying locations of the plurality of machines operating in the jobsite based upon the location data;
organizing at least two machines of the plurality of machines into at least one group of machines;
determining a centroid of the jobsite based on the locations of the plurality of machines and the at least one group of machines;
determining a dynamic boundary of the jobsite based on the locations of the plurality of machines relative to the centroid, wherein the dynamic boundary of the jobsite changes as the locations of the plurality of machines move during operations;
generating, using a machine learning module, a digital representation of the jobsite that illustrates the locations of the plurality of machines in real-time within the dynamic boundary and the at least one group of machines; and
displaying, via a user interface, the digital representation of the jobsite.

14. The non-transitory computer-readable storage medium of claim 13, wherein the operations further comprise:
receiving machine data from devices mounted on the plurality of machines; and
determining the locations of the plurality of machines based on the machine data.

15. The non-transitory computer-readable storage medium of claim 13, wherein the operations further comprise:
determining at least one movement pattern of at least one machine of the plurality of machines based on the locations;
determining a role assignment of the at least one machine based on the at least one movement pattern; and
tagging the at least one machine with the role assignment.

16. The non-transitory computer-readable storage medium of claim 13, wherein the operations further comprise:
organizing the at least two machines into the at least one group of machines based on machine type, location, or role assignment of the at least two machines.

17. The non-transitory computer-readable storage medium of claim 13, wherein the operations further comprise:
displaying the digital representation of the jobsite in a user interface; and
receiving, via the user interface, one or more edits to the digital representation of the jobsite.

18. The non-transitory computer-readable storage medium of claim 13, wherein the digital representation of the jobsite is generated by at least one machine-learning algorithm, wherein the at least one machine-learning algorithm is trained based on at least one dataset associated with previously generated digital representations of jobsites.

* * * * *